United States Patent Office 2,710,246
Patented June 7, 1955

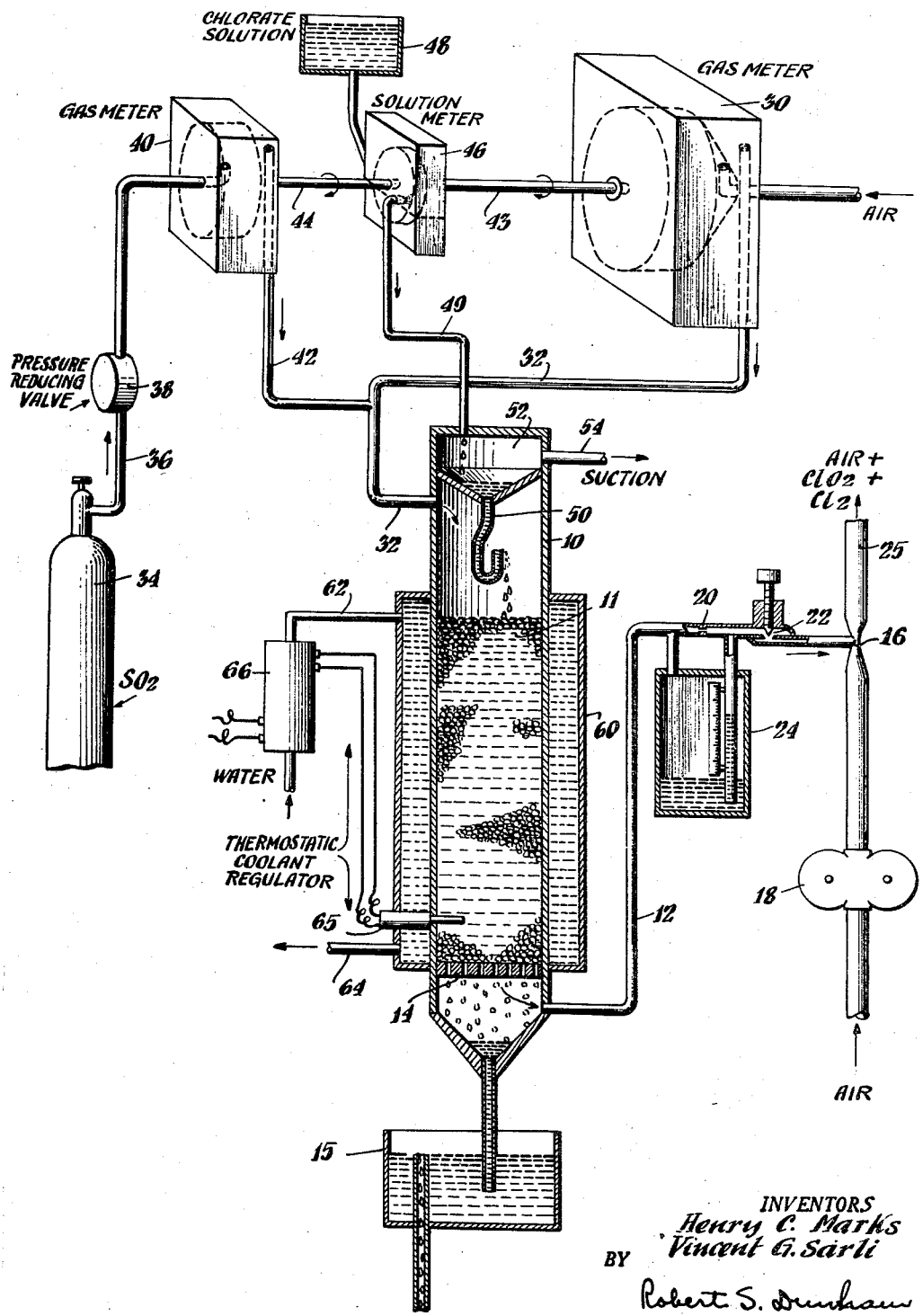

2,710,246

CONTINUOUS METHOD OF PRODUCING DILUTE GASEOUS CHLORINE DIOXIDE

Henry C. Marks, Glen Ridge, and Vincent G. Sarli, Nutley, N. J., assignors to Wallace & Tiernan Incorporated, a corporation of Delaware Application April 5, 1950, Serial No. 154,152

1 Claim. (Cl. 23—152)

This invention relates to the manufacture of chemical substances, specifically the manufacture of chlorine dioxide, and more particularly relates to a process of making chlorine dioxide from relatively inexpensive reactants, which may be practiced at the locality of use of chlorine dioxide to yield a continuous flow of such gas in a desirably dilute condition and which may be accurately regulated, as by simple control of the rate of reactant feed, to afford adjustment of the rate of delivery of chlorine dioxide over a relatively wide range, e. g. between rates which differ by at least five (5) times and preferably over a range of rates from a low value to a maximum equaling 1000% or more of said low value. A further and more specific object of the invention is to afford a continuous method of chlorine dioxide production utilizing sulfur dioxide and a soluble chlorate as the reactants, wherein a continuous yield of dilute chlorine dioxide is produced, essentially free of sulfur dioxide and capable of accurate adjustment in rate.

While various procedures have heretofore been proposed for making chlorine dioxide, including methods involving reaction between sulfur dioxide and an aqueous chlorate solution, most of these methods have failed to consider or provide a ready adjustability of the rate of chlorine dioxide output, for example an adjustability in simple dependence upon the rate of supply of reagents. In the use of chlorine dioxide for manufacture of chlorites or for operations such as the bleaching of paper pulp or the like, it is usually unnecessary to maintain any particular ratio between the chlorine dioxide output and the supplied reagents. In such situations, the primary consideration has been merely that the process be economically feasible. Indeed in most such cases only a single rate of production is necessary, or if some variation is required, it has not been objectionable that the change in output involved a change in the ratio of delivered chlorine dioxide to the supplied reagents.

In certain operations requiring chlorine dioxide, however, of which the treatment of flour is a presently important example, it is extremely desirable to be able to vary the rate of chlorine dioxide delivery over a relatively large range by a simple controlling operation, as well as to make sure that the chlorine dioxide content in the delivered gas never exceeds a safe maximum (say, about 10%) to avoid all possible hazard of spontaneous decomposition of this material. It will be understood that for the treatment of flour to mature or otherwise improve it, as well as for like operations, it is customary that the chlorine dioxide be produced at the locality of use, e. g. in the flour mill. As an example of such operations it may be necessary to operate the producing equipment at a rate as low as 15 grams of chlorine dioxide per hour for certain times, and then at a maximum or high rate of 300 grams per hour during an immediately following part of the day or other period. In order to maintain the desired conditions and particularly to permit a wide change in the rate of chlorine dioxide output, as by an unskilled attendant, it is desirable to effect such result by simple control of reagent feed, i. e. adjustment of the rate of supply of one or both of the introduced reactants. Furthermore, the process should lend itself to correspondingly simple metering so that indication can be given to the operator, that the adjusted change in rate of chlorine dioxide output has been actually effected. Procedure of this sort does not appear to have been available or suggested in the methods heretofore proposed for the production of chlorine dioxide by reaction of sulfur dioxide and chlorate, which are relatively inexpensive materials.

Other factors which have governed the production of chlorine dioxide by the stated reaction, include an attempt to achieve the greatest yield of such gas relative to the chlorate consumed, and also the achievement of a chlorine dioxide output which is free or essentially free of chlorine. While efficiency of yield is important in flour treatment, accuracy and ease of control are of much greater significance, i. e. in a sense heretofore unappreciated in the stated, prior methods of chlorine dioxide production from these reagents. In the prior procedures, effort to avoid chlorine in the effluent gas has involved the use of sulfur dioxide to an extent carrying the latter material into the product, or tending to so carry it, or have alternatively required the use of batch, rather than continuous operations for evolution of the desired product. Indeed certain of the prior procedures have been no more than batch operations, lacking essential disclosure of the criterion now found necessary for an effective, continuous process.

In the treatment of flour it is ordinarily necessary to avoid the presence of sulfur dioxide, even in minor amount. Whereas an important effect of chlorine dioxide on flour is to change it in such fashion that dough made from it can be much stronger and more retentive of gas cells, sulfur dioxide tends to break down the flour so that ultimate dough or other fluid or plastic mixtures derived from it are weaker and less able to retain bodies of gas. While sulfur dioxide treated flour may have some specialized utility in the baking art, as for making crackers, the purpose of chlorine dioxide treatment is, in a sense, diametrically opposite and hence should avoid all possibility of introducing sulfur dioxide along with the desired reagent, i. e. anything more than perhaps mere traces of $SO_2$. On the other hand, chlorine is not deleterious in the treatment of flour and like products by chlorine dioxide, even to the extent or chlorine equal in amount to the chlorine dioxide; nor does it appear to make any difference whether the ratio of chlorine to chlorine dioxide varies or remains constant. Accordingly an important aim of the present invention is to achieve security against contamination of the chlorine dioxide with $SO_2$, a specific feature of the invention being the selection and maintenance of conditions such that the dilute chlorine dioxide, produced by the method, always contains some chlorine, although preferably in minor amount. Since chlorine and sulfur dioxide are mutually reactive in the presence of moisture (such as occurs in and beyond the reaction zone of the process utilizing chlorate in aqueous solution) and therefore cannot coexist in practical effect, the presently preferred procedure insures the absence of $SO_2$ in the effluent product.

To these and other ends, including the provision of a simple, effective and economical method for the continuous production of chlorine dioxide, the present invention contemplates the continuous passage of a solution of a metal chlorate and of dilute gaseous sulfur dioxide through a reaction zone where the chlorate solution is distributed over a relatively large, exposed surface area, for the described reaction between these materials and production of chlorine dioxide, the latter being withdrawn as a dilute gaseous mixture. Special advantage and convenience are achieved by passing the reactants, i. e. chlorate solution and sulfur dioxide, concurrently through the reaction zone; indeed a specific feature of the invention resides in such concurrent procedure, although the criteria now discovered and herein set forth for attainment of the special results of constancy and adjustability of $ClO_2$ delivery are applicable to other, i. e. countercurrent type of operation, e. g. where the chlorate solution is supplied at one end of the reaction zone and the dilute sulfur dioxide at the other end, for travel in opposite directions through the zone and withdrawal of the gaseous product at the region of chlorate introduction. In the specifically novel and preferred concurrent operation the chlorate solution and dilute sulfur dioxide (e. g. a gaseous mixture of sulfur dioxide with air or other suitable inert gas such as nitrogen, carbon dioxide or the like) are continuously introduced at the top of a suitable reaction vessel or tower, the chlorate solution then flowing or trickling down through the packing or other arrangement of distributed surface area while the gaseous reagent similarly passes down through the spaces in such packing or material, for full mutual exposure of these liquid and gaseous reagents. At the bottom or lower parts of the tower the spent solution is withdrawn and likewise the product gas, preferably through separate channels, including an appropriate trap for the solution. The product gas is a gaseous mixture containing chlorine dioxide and also, as explained above, some chlorine, together with diluent gas, e. g. the diluent gas originally introduced with the sulfur dioxide. There is usually also a minor quantity (equalling, say, 1% to 5% of the $ClO_2$) of gaseous hydrochloric acid, HCl. Such effluent gaseous mixture is conducted continuously from the apparatus and directly supplied for use, for instance directly applied to the flour stream in the mill, in accordance with the chemical requirements of the flour milling operation.

In addition to the factors noted above, certain critical values or relationships have now been discovered, as more or less necessary to the attainment of the desired results in the production of chlorine dioxide for use in flour treatment and the like. For example, it has been found of outstanding importance to maintain a specific, constant ratio, selected in a range of heretofore unappreciated significance, between the sulfur dioxide and chlorate, the selected ratio being thus kept constant over all variations of output of chlorine dioxide. Indeed, the value of this ratio, and its peculiarly critical nature, appear to represent a specifically novel concept that is directly related to the attainment of the superior results of the present process, a concept which has not been suggested, so far as can be learned, in prior proposals for the manufacture of chlorine dioxide by reaction between chlorate and sulfur dioxide.

Another significant factor is the volume concentration of sulfur dioxide with respect to the inert gas, i. e. as supplied to the reaction zone. According to present understanding, this relationship or characteristic of the introduced gaseous mixture must remain constant, i. e. at a value selected within a range of fairly critical character, over all rates of chlorine dioxide output. That is to say, in order to maintain constant conversion of chlorate to chlorine dioxide and thus to provide reliable, constant calibration of a given apparatus and procedure, the proportion of sulfure dioxide to diluent gas in the entering mixture should be constant, change in the rate of supply of sulfur dioxide thus in effect involving change in the rate of supply of the complete, dilute mixture.

Another feature of importance is the concentration of the chlorate solution, particularly in that the latter should have at least a minimum concentration for reproducible and accurately adjustable results, yet should be such as to prevent any deposition of chlorate or other solid from the liquid, with consequent clogging of the reaction tower. The temperature of the reaction zone is also preferably maintained within certain limits, as explained hereinbelow, especially to avoid uncertainty of completeness of reaction or uncertainty of result occasioned by chlorine dioxide decomposition at high temperatures. It is also necessary that the reaction zone have a relatively large surface area, to maintain the desired complete exposure of the liquid to the gas, the packing material or other arrangement being necessarily such as to avoid channeling or like interference with the intended results. The arrangement of the reaction zone should also permit effective temperature control.

As indicated above, the ratio of chlorate to sulfur dioxide should be kept constant in any given installation, in order to maintain constancy of the calibration of the operation, i. e. to maintain the desired, reproducible adjustability of the rate of chlorine dioxide delivery by change in the feed of reagents. Furthermore, it appears that the ratio of sulfur dioxide to chlorate lies, very preferably, in a specific range which is specially related to the results here desired. This ratio will be understood to be a ratio of the feed rates of these reagents, viz. sulfur dioxide measured as such and chlorate, measured as sodium chlorate ($NaClO_3$) or the equivalent, in $ClO_3$ content of other chlorate as mentioned below, the ratio being of the weights of these substances. This ratio becomes more critical with decreasing concentration of the sulfur dioxide, in that at greater dilution of the latter, it is necessary (for constant proportionality of $ClO_2$ output to reagent supply) to hold the $SO_2$ and chlorate feed more strictly to the specific value of the ratio that has been selected.

It has been found, for example, that such ratio of sulfur dioxide to chlorate (measured as sodium chlorate) of about 0.7 to 0.75 represents an approximate upper limit, for desired operation with full assurance that the effluent gas contains no sulfur dioxide. Experience has now shown that in operating at a substantially higher ratio, the effluent gases may contain practically no chlorine and may include sulfur dioxide, in an amount depending upon the extent by which the ratio of 0.75 has been exceeded. Excellent results have been obtained at ratios of about 0.6 to 0.7, in that the output usually contains enough chlorine to provide an adequate margin of safety. On the other hand, a ratio higher than 0.3, which represents the stoichiometric amount of sulfur dioxide required to react with the chlorate, is necessary to cause the reaction to proceed satisfactorily. That is to say, it appears that the acid condition caused by an excess of sulfur dioxide over the theoretically equivalent amount is important in order to obtain desirably complete utilization of both chlorate and $SO_2$, and indeed, to assure the desired uniformity of relation between the chlorine dioxide output and reagent input. In actual operation, maintenance of a ratio only slightly above 0.3 affords a relatively small yield of chlorine dioxide; for reasonable efficiency, an $SO_2$ to chlorate ratio of at least 0.5 is at present preferred.

It is likewise extremely desirable to maintain the volume concentration of sulfur dioxide, i. e. in the supplied dilute gaseous mixture, constant over the entire range of operation. If the concentration of sulfur dioxide in the passing gas varies, the conversion of chlorate to chlorine dioxide varies and the desired calibration of the equipment is no longer effective and reliable. The actual concentration of $SO_2$ may be selected within certain limits, the upper being governed by considerations of safety, the $SO_2$ content of the gas being preferably less than 20% in all cases. Indeed it appears that if the sulfur dioxide is appreciably above 15% by volume, the discharged gas may contain more than 10% by volume of chlorine dioxide, with some hazard of spontaneous decomposition or explosion. In many cases it is preferable that the chlorine dioxide concentration in the output of the reaction tower be kept at a selected value in the neighborhood of 4% by volume; such result is obtainable with a sulfur dioxide concentration of 8% or 9% in the input gas, providing the size of the reaction zone, i. e. the gas and liquid contact time, is sufficiently great to insure constant or uniform conversion of chlorate to $ClO_2$ over the desired output range. By the same token, when the input gas contains 12% by volume of $SO_2$ (the remainder being inert diluent, such as air), the delivered product contains about 6% chlorine dioxide.

Stated more generally, it appears that the sulfur dioxide concentration of the supplied gaseous mixture should be about 5% to 15% by volume. Over this range, the concentration of chlorine dioxide increases essentially in accordance with decrease in the proportion of diluent air to the supplied $SO_2$. As indicated above, however, the size of the reaction tower is important in that other things being equal, a larger tower (providing a greater space for distribution of the chlorate solution, i. e. a longer contact time) is necessary to achieve the desired constant proportionality of output to reagent feed, for lower concentrations of $SO_2$. Furthermore, it appears desirable to control the reagent feed values more closely, e. g. the selected $SO_2$ to chlorate ratio and the selected $SO_2$ concentration, when such concentration is in the lower values. Indeed ordinarily for flour-treating operations and the like as here contemplated, the sulfur dioxide content of the input gas should be substantially above 5%, to avoid the need for a reaction vessel of unwieldy size.

From the standpoint of yield, based on chlorate, the concentration of chlorate in solution should be as high as possible, an upper limit being set by the point at which solid material may tend to crystallize or otherwise be deposited out of solution so as to plug the reaction zone. Thus the chlorate concentration must be sufficiently low to prevent crystallization of the sulfate into which most of the sodium or other metal ion is converted, and indeed to prevent such crystallization of the chlorate itself as may occur if the solution is too close to saturation. For example, a concentration of about 600 grams per liter of sodium chlorate (5.63 molar, i. e. 5.63 mols per liter) has been found particularly advantageous, for use in the present process. At concentrations substantially higher, crystallization and plugging of the tower are apt to occur. Below 2 molar, the chlorate solution is believed to be too dilute for effective and reproducible results, although there appears to be some distinct utility in operations in the neighborhood of 3 molar. Preferred results are apparently had with concentrations (measured as sodium chlorate, or the equivalent of other chlorate in $ClO_3$) in the range of 4 mols per liter and upwards, preferably less than 6 mols per liter. Other chlorate salts may be used in lieu of sodium chlorate, although potassium chlorate appears to be insufficiently soluble for effective use and calcium chlorate is undesirable since it yields insoluble calcium sulfate that will plug the tower. Magnesium chlorate and lithium chlorate are both believed to be satisfactory, but sodium chlorate is at present greatly preferred, being readily available at a low cost and having desirable physical properties.

Optimum results have been found dependent on the maintenance of proper temperature in the reaction zone through which the reagents are passed, i. e. preferably concurrently as explained above. Thus it appears that if the reaction mixture is kept below 20° C., the conversion of chlorate to chlorine dioxide is undesirably low and tends to fall short of uniformity. If the temperature in the reaction zone rises to a very high value, it appears that substantial chlorine dioxide may be lost by spontaneous decomposition, present evidence indicating that temperatures exceeding 60° C. are undesirable for this reason. Indeed, if it is attempted to control the operation at 60° C., even slight departures above this value have been found to jeopardize the constancy of $ClO_2$ output; to insure the desired results, it is much more practical to set 50° C. as the approximate upper limit or control point.

The maintenance of proper temperature conditions in the reaction tower or like vessel is closely related to the size or dimensions of the tower or zone. For example, a reaction zone of large diameter is difficult to cool, with the result that a simple cooling jacket may not prevent the interior of the tower from becoming excessively hot. With vessels of moderate size, for example, not greater in diameter (or other equivalent dimension) than about five inches or so, a simple cooling jacket is effective. Even in such case, it appears desirable, in order to have a wide range of chlorine dioxide output available, to employ some thermostatic or like control. For example, whereas a given flow of water at 20° C. may be useful at a high range of $ClO_2$ output (200 grams per hour), the same coolant flow and temperature may be unsuitable when the chlorine dioxide output is reduced to a low value of 15 to 20 grams per hour, viz. in that the heat of reaction is then insufficient to keep the temperature within the optimum range (against the cooling effects of the water jacket and of the flow of gas) and the proportionality between supplied chlorate and delivered chlorine dioxide may be impaired. In some cases, a careful selection of temperature and rate of flow of coolant may suffice for a considerable range of rates of operation, particularly since it does not seem necessary that the temperature in the reaction zone be precisely the same for all rates of $ClO_2$ to output, i. e. providing that throughout the entire range of such rates it is always somewhere within the indicated boundaries (presently understood to be from 20° to 60° C., and preferably not more than about 50°). More usually, however, it is desirable to maintain a substantially constant temperature throughout various rates of operation, such temperature being achieved by regulating either the temperature of the cooling water or its rate of flow, in either case under control of suitable thermally responsive means exposed in the tower.

As will now be seen, the size of the reaction zone or vessel is in some respects limited by the possibility of good heat transfer, e. g. for a given chlorine dioxide output, and at the same time should be great enough to accommodate the minimum content of $SO_2$ input expected to be used in the gas supply. For example, assuming the use of a packed (contact) zone of about 26 inches in height in the reaction tower, the following are some instances of tower sizes and other values found to be significant: With the $SO_2$ input concentration at about 15%, satisfactory $ClO_2$ output up to 200 grams per hour can be had with a tower of at least 2 inches diameter, and up to 300 gm./hr. with a 3-inch diameter tower. Where the sulfur dioxide is supplied in greater dilutions, the tower should be correspondingly larger, e. g. even up to 4 or 5 inches in diameter to permit an output of 300 gm./hr. of chlorine dioxide for $SO_2$ concentrations ranging from 12% down to 8 or 9%. Thus a 2 inch diameter vessel supplied with sulfur dioxide at 8% and having the abovementioned height of reaction zone cannot ordinarily be expected to afford constant, uniform yield of chlorine dioxide over an output range much beyond 70 gm./hr.

The packing in the tower should afford a relatively large surface area, for example conveniently as measured in proportion to the volume of the reaction zone. One suitable type of packing is with small alundum cylinders or granules having lengths and diameters slightly less than 3 mm. and having an average weight of slightly under 0.4 gram. So packed, the effective surface area to volume ratio in the tower may be as high as 10 or 11 (e. g. in square centimeters per cubic centimeter). Somewhat coarser packing or other dispersive arrangement may be employed, although appreciable channeling of the solution is to be avoided as tending to impair the desired, uniform rate of conversion.

Operation in accordance with the foregoing criteria has commonly provided an output of chlorine dioxide representing about 60% of that theoretically obtainable from the chlorate used. With lower ratios of $SO_2$ to chlorate or with lower chlorate concentrations than the optimum values stated above, the conversion or yield is usually below 60%. The percentage yield, however, seems to be substantially independent of the sulfur dioxide input concentration (at least over the preferred range of the latter mentioned above), provided the reaction zone is sufficiently large or is suitably increased, if necessary, for lower values of SO₂ input content. As has been indicated, failure to attain yields much in excess of 60% is of no consequence in the present process, wherein constancy of output is a paramount requirement, as distinguished from theoretical efficiency.

Under the stated, preferred conditions, the effluent gas is found to contain chlorine (Cl₂) equal in amount to about 15% to 25% of the volume of chlorine dioxide present. If the sulfur dioxide to chlorate ratio rises (from a value of 0.65 or 0.7), the chlorine content of the output decreases below the amounts just mentioned. For safety, in the respects explained above, a content of chlorine in the output equal to at least about 5% by volume of the chlorine dioxide should ordinarily be maintained. Excessive chlorine in the output is not ordinarily deleterious in the use of the product, i. e. in amounts not greater than 100% of the ClO₂ volume, but represents decreased conversion of chlorate to chlorine dioxide, and thus a departure from optimum economy.

A specific example of the process may be conveniently set forth in relation to the accompanying drawing, which illustrates one embodiment of apparatus that may be employed for carrying it out, such illustration in the drawing being of a relatively simplified and diagrammatic character.

Although other kinds of apparatus may be used, the arrangement shown is particularly effective, and represents certain novel and improved combinations of instrumentalities disclosed and claimed in the copending U. S. patent application of George M. Booth, Serial No. 61,936, filed November 26, 1948, now U. S. Patent No. 2,683,079, for Apparatus and Procedure for Preparing Gaseous Products, and likewise in the corresponding pending patent application in Great Britain No. 26,249 of 1949, filed October 12, 1949, by Novadel-Agene Corporation, with identical title.

As performed in such apparatus, the present process involves the continuous, concurrent passage of sodium chlorate solution and dilute sulfur dioxide downward through a reaction tower 10, i. e. through the packing 11 in such tower, for the stated reaction to evolve a dilute mixture of chlorine dioxide and chlorine through the output conduit 12. The packing 11 is supported by a perforate support 14 near the base of the tower, permitting the spent solution to drain to waste through a suitable trap 15. Flow of gas through the tower is maintained by the suction of venturi-type air aspirator 16, supplied with air at a regulated rate of flow by the blower or like device 18. Thus the aspirator 16 draws the effluent gas from the tower through the line 12, past a metering orifice 20 and an adjustable control orifice 22, the rate of flow, and thus the rate of delivery of chlorine dioxide, being read (for instance in grams per hour) by a manometer 24 across the orifice 20. The effluent gas thus enters the air conduit 25 leading from the aspirator, and is further diluted with air, as is in fact desirable for application in flour treatment, but the actual rate of delivery of chlorine dioxide, e. g. in grams per hour, is determined by the adjustment of the orifice 22 and is thus independent of the amount of dilution in the output line 25.

By virtue of the thus regulated flow of gas in the line 12 and downwardly through the tower 10, the rate of supply of reagents is directly determined. For example, air is supplied through the meter 30 and conduit 32 to the head of the tower, sulfur dioxide gas being similarly supplied from a tank 34 or other source and line 36 (including a pressure reducing valve 38 keeping the SO₂ input at the same atmospheric pressure as the input of the meter 30) to the meter 40 which delivers it via the conduits 42 and 32, into the tower. The meters 30 and 40 are preferably displacement-type devices, such as of the nature of so-called wet gas meters, adapted to turn and thereby deliver gas at a corresponding rate, in direct response to the rate of withdrawal of gas from the tower 10. While the air-feeding meter 30 may employ water as the sealing medium, the device 40 preferably uses oil or other liquid in which sulfur dioxide is insoluble. Conveniently, these devices may have a common shaft 43—44, and be so proportioned in size that as turned by the flow of gas (under the influence of suction at the aspirator 16) they maintain the desired, absolutely constant proportionality of sulfur dioxide to diluent air.

The shaft 43—44 may also operate a solution meter 46, connected (as by suitable means not shown) to withdraw sodium chlorate solution from a supply 48 and deliver it to the head of the tower through a conduit 49. Conveniently, the upper part of the tower may be a separate chamber, separated by the trap 50 from the space above the packing 11 and from the region of entry of gas by the pipe 32. Thus by utilizing a volumetric, rotatably operated liquid meter 46, which is adapted to deliver solution upon application of suction to the line 49 but strictly in proportion to the rotation of the shaft 43—44 (rather than in relation to the amount of suction), metered quantities of chlorate solution are supplied. A solution meter suitable for this purpose is disclosed in U. S. Patent No. 1,593,109. Suction for thus effecting advance of solution through the line 49, but at a rate governed solely by the rotation of the shaft 43—44 may be applied to the upper chamber 52 of the tower, through the pipe 54. It will now be seen that air, sulfur dioxide and chlorate solution are delivered to the head of the tower in a predetermined exact proportionality to each other, and at a rate governed by the operation of the gas metering devices, principally the air-meter 30. The operation of the latter is in turn controlled by adjustment of the orifice 22, which thus in effect adjusts the rate of reagent feed, in an accurate fashion which may be calibrated (with the process running at the desired constancy as elsewhere explained herein) on the scale of the manometer 24, for instance in grams per hour of chlorine dioxide.

The tower may also have a cooling jacket 60 supplied with water through inlet line 62 and discharging water, after circulation, through outlet 64. A thermostatic element 65 extending into the reaction zone 11, controls suitable means indicated generally at 66, e. g. means for regulating the rate of flow of the water (as supplied at a constant, low temperature) or electrically actuated or like means for cooling the water, or for warming it above an original, low temperature. It will be understood that the effect of the instrumentalities 65—66 is to provide approximately constant temperature in the reaction zone 11, over a substantial range of rates of production.

As a specific instance of operation in accordance with the process, chlorate solution consisting of 600 grams per liter of sodium chlorate (a water solution with no acid or other substance added) is supplied from the vessel 48 through the meter 46 and elements 49, 52 and 50, to the head of the packing 11, so as to trickle continuously through the latter, distributed as a thin film over the surface of the packing. Sulfur dioxide and air are fed continuously by the meters 40 and 30, and so that the gaseous mixture entering the tower through the pipe 32 has a constant content of 12% SO₂. By circulating water at 40° C. through the jacket 60, e. g. at a rate of about 1 liter per minute, the temperature in the tower is maintained at a value substantially less than 60° C. throughout an entire range of operation up to about 300 grams per hour output of ClO₂. With thermostatic regulation as shown, the temperature in the tower can be maintained at an exactly desired value, say 40° to 50° C. The packed region 11 of the tower has a height of about 26 inches, and an inside diameter of about four inches, being filled with reasonably tightly packed alundum cylinders of the dimensions and weight stated hereinabove.

Operation of the process in this fashion yields an output of chlorine dioxide gas, diluted with air and containing some chlorine, through the line 12. The rate of such delivery is continuously variable from a maximum of about 300 grams ClO₂ per hour down to essentially zero flow, e. g. by adjustment of the orifice 22. This represents a very wide range of output; indeed variation from 15 to 300 grams represents, in itself, a twenty-fold difference. Throughout the entire range, the adjustment is obtained, in effect, by changing the feed or reagents, and experiments shown that the rate of chlorine dioxide delivery is accurately proportioned to the reagent feed at all points in the range. The yield of ClO₂ is about 60%, based on the chlorate. The effluent gas contains from 15 to 25% chlorine, not departing substantially from these values at any point in the entire range.

When the process is first initiated or is re-initiated after a shut-down (during which the tower has been washed out), attainment of equilibrium conditions and maximum ClO₂ yield may take considerable time if the reagents are simply fed to the tower in the selected ratio. It has been found, however, that the full desired output of chlorine dioxide is promptly reached if the tower is first treated with solution, i. e. by preliminarily feeding chlorate solution (without SO₂) for about five to ten minutes. The solution thus supplied need not usually amount to more than a minor fraction of the total liquid capacity of the tower, the object of the step being simply to have excess chlorate solution present during the initial feed of SO₂ which follows. In the illustrated apparatus, this preliminary step can be effected by temporarily disconnecting the conduit 36 from the tank 34 (and permitting it to receive air) while allowing the apparatus to run in otherwise normal fashion.

It will now be seen that the present invention affords a continuous process for production of chlorine dioxide from sulfur dioxide and chlorate, yielding an effluent in which the absence of SO₂ is assured and providing an operation wherein the rate of chlorine dioxide production may be accurately and simply controlled by adjusting the rate of reagent feed. While as stated, the process is preferably designed for and is of unusual and novel advantage with concurrent flow of reagents through the reaction zone (as in the drawing), experience has indicated that essentially the same criteria and conditions apply to operation with countercurrent passage of the reactants through the tower. For example, where the dilute sulfur dioxide and chlorate solution travel in opposite directions, as by passing the solution downward while the reagent gas is delivered at the bottom and the product gas withdrawn at the top (e. g. by transposing the connections of the pipes 32 and 12 to the tower 10 in the drawing), the same critical ranges and optimum value of the various factors are understood to obtain, although such operation is usually less convenient and somewhat less efficient, and in particular, is not as smooth and uniform.

It is to be understood that the invention is not limited to the specific procedures hereinabove described, but may be carried out in other ways without departure from its spirit.

What is claimed is:

In a method of continuously producing dilute gaseous chlorine dioxide wherein aqueous chlorate solution and dilute sulfur dioxide are simultaneously continuously passed through a reaction zone of predetermined size while the chlorate solution is distributed as a thin film over a large surface area exposed to said sulfur dioxide for reaction between the sulfur dioxide and chlorate to produce chlorine dioxide and chlorine, wherein the dilute sulfur dioxide consists essentially of diluent gas containing sulfur dioxide in the range of about 5% to about 15% by volume, wherein the chlorate solution is maintained at a selected concentration of soluble chlorate of at least about 4 mols per liter, wherein there are continuously separately withdrawn from said zone spent liquid and a gaseous mixture consisting essentially of the diluent gas, chlorine dioxide and chlorine, and wherein said method has been put in operation to deliver chlorine dioxide from said zone, in said last-mentioned gaseous mixture, at a predetermined output rate which remains constant so long as the chlorate solution supply and dilute sulfur dioxide supply are kept constant, the improvement which comprises adjusting the output rate of said chlorine dioxide from said zone throughout a range of output rates which includes the aforesaid predetermined output rate and which extends between limits differing by at least 5 times and selecting and establishing for continuing operation any desired chlorine dioxide output within said range while providing complete consumption of sulfure dioxide in said zone and effective production therein of chlorine dioxide with accompanying chlorine, by varying the rates of feed into said reaction zone of both said dilute sulfur dioxide and said chlorate solution simultaneously, while maintaining a constant selected content of sulfur dioxide in the diluent gas within the aforesaid range of sulfur dioxide content and while maintaining the temperature of said reaction zone between about 20° and about 60° and while maintaining a constant selected ratio of feed rates of sulfur dioxide to soluble chlorate, measured by weight, which is at least as great as about 0.5 and not greater than about 0.75, for effectuating proportionality of the aforesaid adjustment of chlorine dioxide output to the aforesaid variation of sulfur dioxide and chlorate feed throughout the aforesaid range of output rates.

References Cited in the file of this patent

UNITED STATES PATENTS

| | | |
|---|---|---|
| 2,481,240 | Rapson et al. | Sept. 6, 1949 |
| 2,598,087 | Wayman et al. | May 27, 1952 |